United States Patent
Shaver et al.

(10) Patent No.: US 8,861,117 B2
(45) Date of Patent: Oct. 14, 2014

(54) DATA INTERSECTOR GAPS FOR DATA SECTOR FORMAT

(71) Applicant: Seagate Technology LLC, Cupertino, CA (US)

(72) Inventors: Jimmie Ray Shaver, Yukon, OK (US); Barmeshwar Vikramaditya, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/842,851

(22) Filed: Mar. 15, 2013

(65) Prior Publication Data

US 2014/0268396 A1      Sep. 18, 2014

(51) Int. Cl.
*G11B 5/09* (2006.01)
*G11B 20/12* (2006.01)

(52) U.S. Cl.
CPC .................................. *G11B 20/1252* (2013.01)
USPC ........................................................... 360/48

(58) Field of Classification Search
None
See application file for complete search history.

(56) References Cited

U.S. PATENT DOCUMENTS

| | | | |
|---|---|---|---|
| 6,594,096 | B2 | 7/2003 | Burns et al. |
| 6,611,391 | B1 * | 8/2003 | Murphy et al. ................. 360/50 |
| 7,679,852 | B2 | 3/2010 | Shaver et al. |
| 7,969,676 | B2 | 6/2011 | Buch et al. |
| 8,085,486 | B2 | 12/2011 | Lam |
| 2010/0118428 | A1 | 5/2010 | Buch et al. |
| 2010/0118429 | A1 * | 5/2010 | Vikramaditya et al. ........ 360/51 |
| 2010/0161917 | A1 * | 6/2010 | Reddy ............................ 711/156 |
| 2012/0082015 | A1 | 4/2012 | Grobis et al. |

* cited by examiner

*Primary Examiner* — Regina N Holder
(74) *Attorney, Agent, or Firm* — HolzerIPLaw, PC

(57) ABSTRACT

A data format that allows for format-efficient data storage, particularly on bit-patterned media. The data format uses an intersector gap that is dimensioned relative to a physical dimension of a transducer. Further described is a data storage medium comprising transducer overhead, such as an intersector gap, interleaved with fragment overhead. Also described is a storage medium comprising intersector gaps that each include a write splice and extra symbols.

18 Claims, 7 Drawing Sheets

DATA INTERSECTOR GAPS FOR DATA SECTOR FORMAT

SUMMARY

The detailed description describes a data format that uses an intersector gap that is dimensioned relative to a physical dimension of a transducer. Further described is a data storage medium comprising transducer overhead, such as an intersector gap, interleaved with fragment overhead. Also described is a storage medium comprising intersector gaps that each include a write splice and extra symbols.

DETAILED DESCRIPTION

Figure 1:
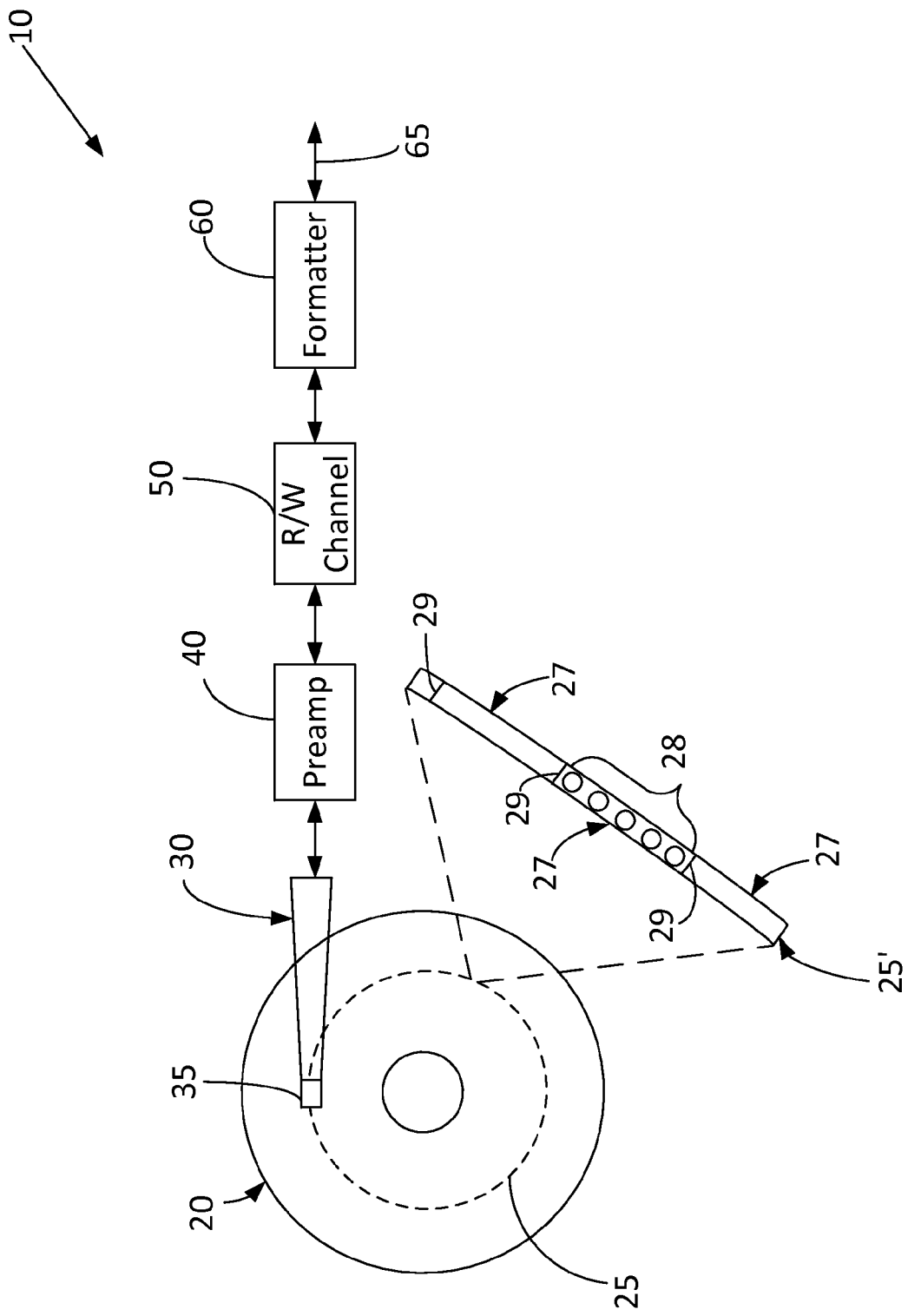
FIG. 1 illustrates a device that uses bit-patterned media.

The capacity of a storage device, such as a disc drive, can be increased by using bit-patterned media (BPM). Such a disc drive is shown in FIG. 1. Disc drive 10 includes BPM 20 that stores data on tracks, one shown as track 25. In some embodiments BPM 20 may also be a heat assisted magnetic recording medium that includes features to enable that technology. Data on track 25 is accessed by a transducing head 35 on an actuator arm 30, a preamplifier 40, a channel 50 and a formatter 60.

BPM 20 is constructed with isolated areas (referred to as "dots" or "islands") of the magnetic material of BPM 20, each dot intended to contain one bit of data or more than one bit of data in a multilevel environment. To illustrate, track portion 25' is shown that includes data wedges 27 and servo sectors 29. Data wedges 27 include dots 28 that are used for storing data and overhead information. Each dot is separated from its adjacent dots by regions of non-magnetic material. There can be thousands, millions or more of dots for each data wedge.

Servo sectors 29 are used by components of disc drive 10 to obtain position information such as the number of the track that transducing head 35 is tracking, the circumferential position of transducing head 35 relative to that track, fine positioning information that is used to keep transducing head 35 on that track, etc.

To write data to BPM 20, formatter 60 receives data on bus 65. The data can be from a system or host using disc drive 10, or can originate from within disc drive 10. Formatter 60 formats the data for each data wedge 27, then sends the formatted data to channel 50. Channel 50 encodes the formatted data for storage on BPM 20. In the meantime, channel 50 is also synchronized with the dots on a BPM track so that channel 50 can timely provide the encoded, formatted data to preamplifier 40. Preamplifier 40 transmits the signal representing the encoded, formatted data to transducing head 35. A writer (not shown) of transducing head 35 then interacts with a BPM track to write the encoded, formatted data. Reading of data from a BPM track is processed in reverse of the manner described.

BPM 20 also contains embedded timing burst patterns (not shown) that are formatted into the dots 28 of data wedges 27 at preferred regular timing intervals. These embedded timing burst patterns are referred to as iPLL (interspersed phase-locked loop) fields or "P fields." The P fields can have a different physical dot pattern (e.g., frequency) than the dots for the remaining part of the data wedge. Circuitry in the disc drive, particularly channel 50, uses the P fields to obtain phase and frequency clock synchronization with the dots 28 on BPM 20. The timing interval between the P fields is based on a magnitude and a bandwidth of tolerable timing disturbances between channel 50 and BPM 20. Specifically, the frequency tolerance and interval between P fields is chosen to ensure that under sustained operating conditions an accumulated phase error stays within limits for reliable writing.

Figure 2A:
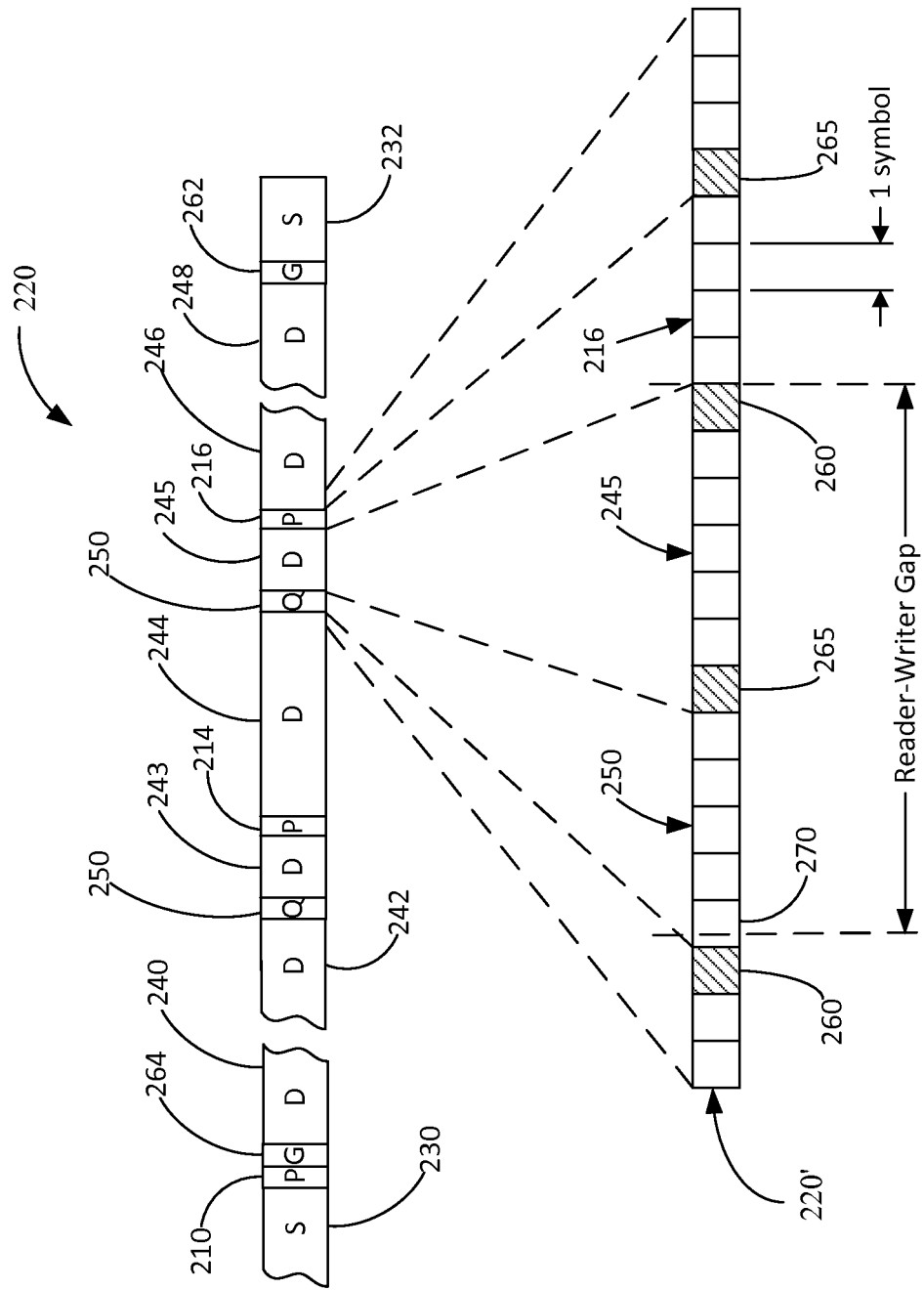
FIGS. 2a and 2b illustrate a data format for a data wedge.

FIG. 2a shows a single BPM data wedge between two servo fields containing multiple P fields. P fields 210, 214, 216 break data wedge 220 between servo fields 30, 32 into multiple data regions 240, 242, 243, 244, 245, 246, 248. During write operations the P fields 210, 214, 216 are read to obtain timing phase information to feed back into the data phase-locked loop (PLL) of the channel. While the reader (not shown) of the transducing head is reading the P fields 210, 214, 216, the writer is "quiet." The writer is either not energized or writing a DC field to avoid inducing noise into the reader or read signal. To facilitate this, quiet fields 50, or "Q fields," are formatted onto the media prior to each P field 214, 216 since the writer trails the reader in the transducing head. The precise location of each Q field 50 relative to its associated P field can vary from head to head and from track to track due to the variations in the effective reader-writer gap. Since no data is written in the date wedge 220 prior to P field 210, no associated Q field is used. Each of the data regions 243, 245 between the Q and P fields are referred to as a "runt data regions."

The placement of each Q field can be determined during manufacturing and saved for each track and potentially each zone. During that time all the transducing heads of a disc drive are characterized, particularly the reader-writer gap for each transducing head across all zones of each surface of each BPM in the disc drive. A zone can consist of multiple tracks that have characteristics similar enough that they can all be treated the same for purposes of accessing data stored on them. For example, a zone can have multiple tracks that have the same data wedge format and the same data frequency.

Figure 2B:
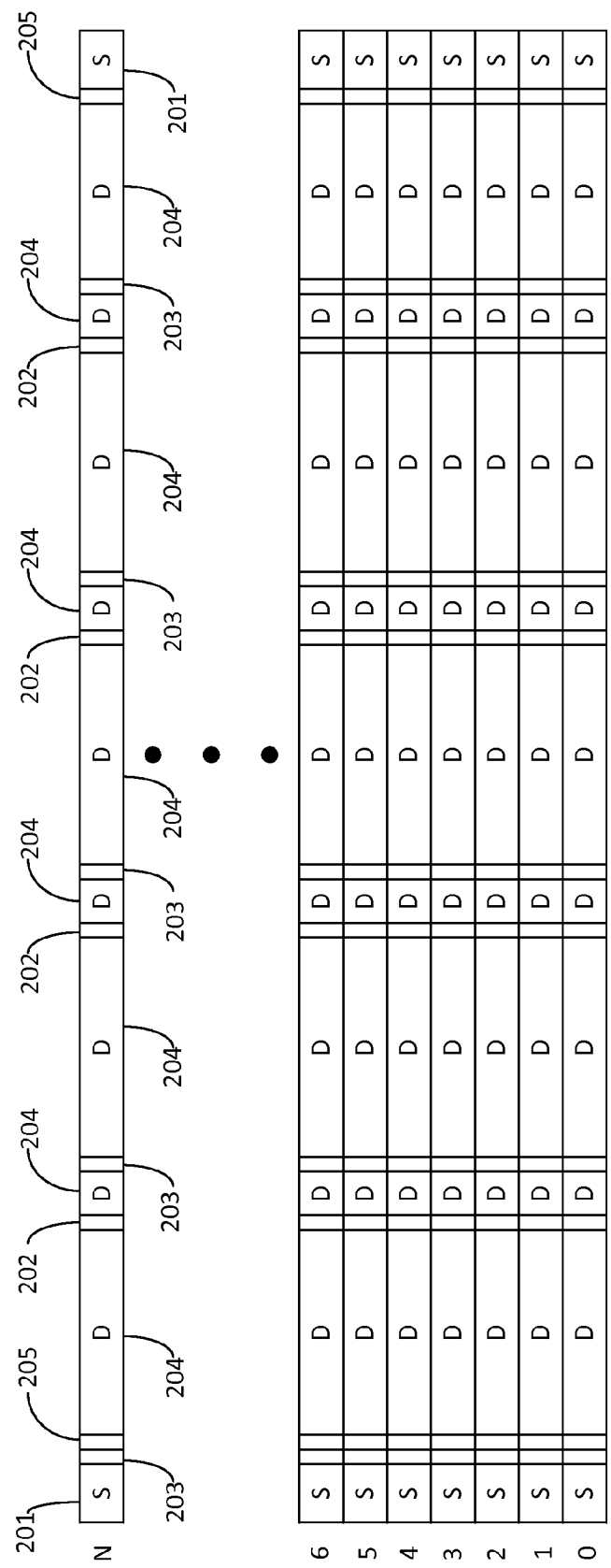

FIG. 2b illustrates a zone that includes radially-aligned data wedges of tracks 0-N. Servo sectors 201 bound Q and P fields 202, 203, data regions 204, and gaps 205 before and after the servo sectors. As shown, Q and P fields are radially aligned within a zone. The Q and P fields can be individually and collectively considered as "transducer overhead."

Tracks 0-N constitute a zone on a surface of the BPM. As such, tracks 0-N have similar characteristics so that the disc drive firmware can easily control access to them. For example, the data wedges have the same number of dots between servo sectors 201.

Turning back to FIG. 2a, illustrated is a larger scale data wedge portion 220' of the data wedge 220 showing the relative positions for Q field 250 and P field 216. Data wedge portion 220' is composed of several defined areas on the media called "symbols" that are shown as squares in data wedge portion 220'. Each symbol is 12 bits (dots) long, for example.

P fields are preferably aligned to symbol boundaries, and can include pad bits in the beginning and/or end symbols to facilitate the symbol alignment. P fields can also include a synchronization pattern. Preferably Q field 250 is sized at least one symbol larger than its associated P field 216 since the reader-writer gap may not be an integer number of symbols. To illustrate, the reader-writer gap is shown to extend from the first symbol of P field 216, back to within symbol 270 immediately after postamble 260. Since P field 216 is 4 symbols long, Q field 250 includes symbol 270 and the immediately following four symbols. Also, the effective reader-writer gap varies with the transducing head skew angle, so the position of the Q field relative to the P field is dependent on the radial position of the data track within the zone. The size of the Q fields is preferred constant across such zone, or at least on the same track.

The disc drive firmware can determine the size of the runt data region 245 between Q field 250 and P field 216, based on the reader-writer gap of the corresponding transducing head at the corresponding data track. In FIG. 2a the number of symbols between the beginnings of the Q and P fields is 12, so 12 minus the 5 symbols of Q field 250 leaves 7 symbols for runt data region 245, including preamble 265 and postamble 260.

Preamble and postamble fields 265, 260 shown in FIG. 2a can be used immediately before and after every area of contiguous data to support the decoder function in the channel that recovers the actual bits from the encoded bits on the BPM. These fields preferably are one symbol each. The preamble and postamble fields do not have to be the same size, but each are the same size for the entire track and potentially a zone.

Due to the unipolar nature of the P field media pattern (e.g., ++00) the signal read from the P field may not be sufficient to serve as valid preamble or postamble data for the decoder of the channel. Therefore, a postamble field is used before every P field, and a preamble field is used after every P field for the decoder. Since the Q field can be written as a DC pattern over BPM, it has different read-back characteristics than the P field. The Q field may not have to use a postamble field or a preamble field. However, as shown in FIG. 2a, the preamble and postamble fields 265, 260 are used around both P and Q fields, and they are each one symbol long. Each preamble and postamble, if used, associated with respective Q and P fields is also part of the transducer overhead.

During read operations the channel skips the Q fields 250 and reads the P fields 210, 214, 216 of data wedge 220 to maintain the channel PLL synchronization with the BPM. Even if some of the sectors are being skipped (for example, they are not part of the requested block transfer), the channel still reads and demodulates the P fields. Note that a gap before servo 262 compensates for the reader-writer gap and write-to-read recovery time when switching from writing data to reading servo data. A gap after servo 264 may be used to support servo-recovery to data-recovery switching time and for recording special data fields, such as repeating run-out and repeating timing run-out fields, if needed.

Figure 3:
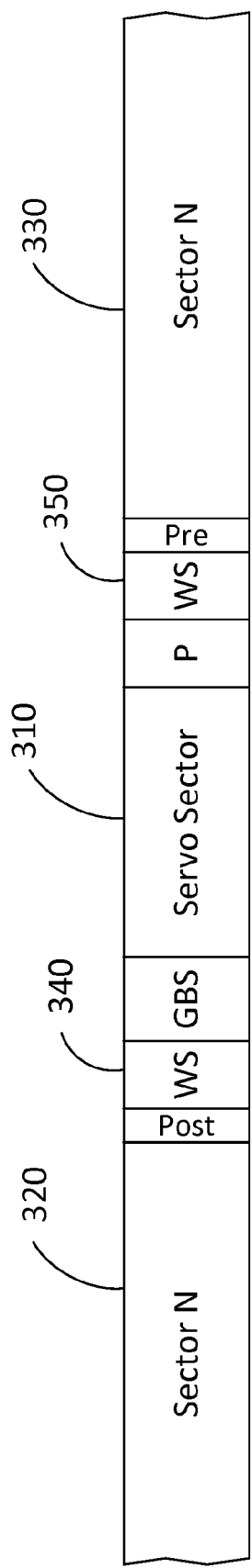
FIG. 3 illustrates two data wedges split by a servo wedge.

Referring to FIG. 3, a data sector is shown that is split on a track by a servo sector. Servo sector 310 is interposed to a data region 320 and a data region 330 of data sector N. In the case where servo sector 310 contains bipolar (e.g., ++−−) data fields such as a repeatable run-out compensation field, the preamplifier should be turned off while the transducing head is over servo sector 310. In that case, write splice (WS) 340 is placed at the end of the data region 320 to accommodate the time the preamplifier takes to turn off its write current. Write splice (WS) 350 also is placed at the beginning of the data region 330 to accommodate the time the preamplifier takes to turn on the write current. The size or length (or duration) of a write splice represents a current transient in the writer circuit that would interfere with any read operation, such as recovering a P field. In addition, preamplifiers can produce a high-frequency "degaussing" burst to the writer shortly after switching out of write mode. That degaussing is also taken into account in determining the WS duration. If servo sector 310 does not have bipolar data fields, the preamplifier can be left on while the transducing head is over servo sector 310. With this configuration WS 340, 350 can be eliminated, and a more efficient track format is had.

In addition, preferably a preamble field is placed at the beginning of every data region after a write splice (as shown in FIG. 3, for example) if the write splice exists at the beginning of the fragment. Similarly, a postamble field is placed at the end of every data region before a write splice if the write splice exists at the end of the fragment. Regardless of where they are used in the data wedge, each preamble is the same symbol length and each postamble is the same symbol length. The same is true for the entire track and potentially the zone.

Figure 4:
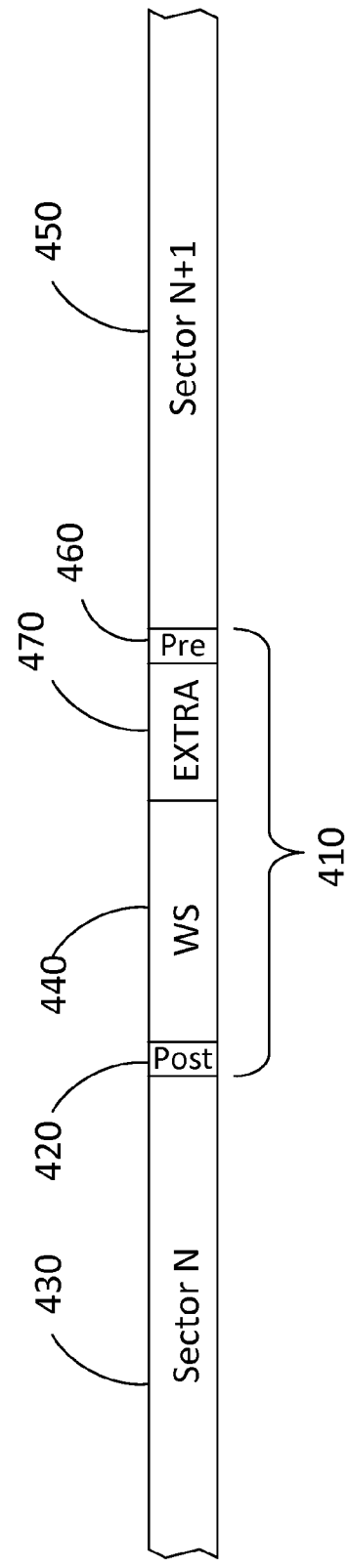
FIG. 4 illustrates an intersector gap between two data sectors.

To support random access of the data on the BPM, in which any single sector on the media can be read or written individually, the data format includes intersector gaps (ISGs) between sequential data sectors. Referring to FIG. 4, an ISG 410 includes a postamble field 420 immediately at the end of data region 430, a write splice (WS) field 440 shared by both data regions 430, 450 for optimum format efficiency, and a preamble field 460 immediately preceding data region 450. ISG 410 also includes a predetermined number of extra symbols 470 to accommodate P and Q field interruptions of the ISG 410, in which cases the position of the WS 440 may have to move later than its preferred earlier position. As an example, ISG 410 can be thirteen symbols wide with postamble 420 and preamble 460 being one symbol each, WS 440 being seven symbols, and extra symbols 470 being four symbols. FIG. 4 represents an ISG that occurs in a portion of a data wedge away from any Q or P field.

If only data region 430 is written, the channel turns off the preamplifier write current at the beginning of WS 440. If only data region 450 is written, the channel turns on the preamplifier write current at the beginning of WS 440. If both data regions are written back-to-back, the write current remains on during the entire ISG.

Figure 5:
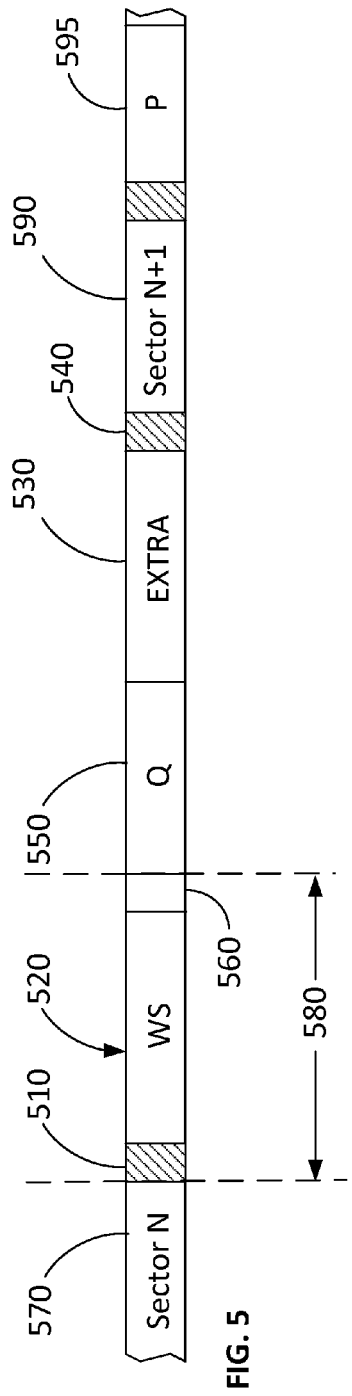
FIGS. 5-7 illustrate intersector gap interleaving with Q and/or P fields.

When the data wedge format produces an ISG that is interrupted by a Q or P field, the formatter determines the correct location of the write splice. In FIG. 5, the ISG is thirteen symbols long and includes postamble 510 (one symbol), WS 520 (seven symbols) that includes symbol 560 (explained below), extra symbols 530 (four symbols) and preamble 540 (one symbol). The ISG is interrupted by Q field 550. The number of symbols 580 between the end of data region 570 and the beginning of Q field 550 is eight. The formatter determines that there is enough symbol area between the end of data region 570 and Q field 550 for WS 520 to be placed before Q field 550 along with postamble 510. Note here that WS 520 is allowed to use the symbol area 560 reserved for the postamble immediately before the Q field because the ISG already includes postamble 510 for data region 570. Thus there is no need to use symbol area 560 for a postamble immediately before Q field 550.

Extra symbols 530 and preamble 540 start immediately after Q field 550 in the runt data region between Q and P fields 550, 595. Extra symbols 530 start in the symbol immediately after the Q field that is reserved for the preamble. Since the ISG already includes preamble 540 for data region 590, the reserved preamble symbol does not have to be used as such.

Figure 6:
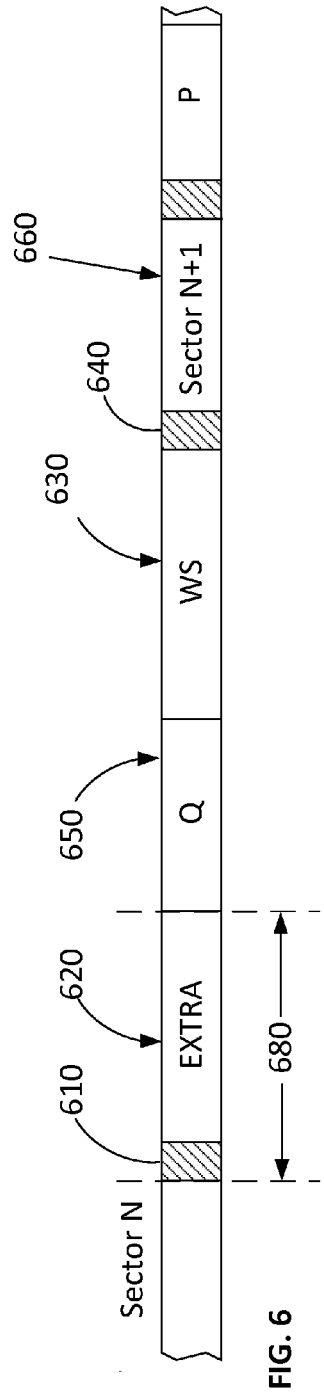

In FIG. 6, an ISG (including postamble 610, extras symbols 620, WS 630 and preamble 640) occurs in the track layout one symbol later than in FIG. 5, and is interrupted by Q field 650. Here, the formatter determines that there is not enough room to place the 7-symbol WS 630 and the 1-symbol postamble 610 before Q field 650 since the number of symbols 680 is seven, so WS 630 is instead placed immediately after Q field 650 starting in the symbol that is reserved for the preamble. Extra symbols 620 are placed before Q field 650. As the ISG already includes preamble 640 for data region 660, the reserved preamble symbol immediately after Q field 650 does not have to be used as such. Likewise, extra symbols 620 use the reserved postamble before Q field 650 since the ISG already includes postamble 610.

Figure 7:
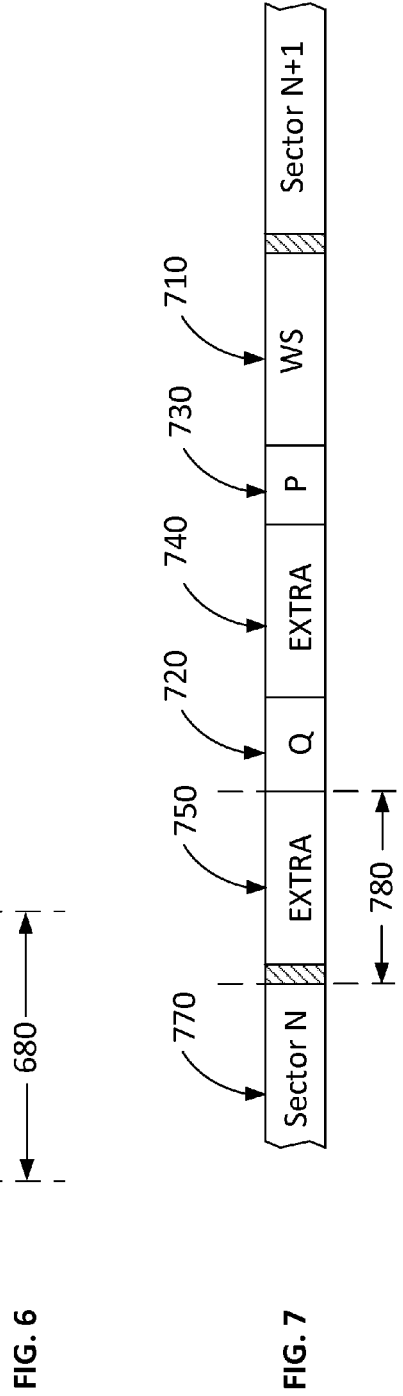

Depending on at least one of the lengths of the P fields, the Q fields, the write splice, the effective reader-writer gap, and the linear bit density of the media, the write splice may be too large to fit in the runt data region between the Q and the P fields. In this case, the ISG is sized so that there is room for a write splice field either before the Q field or after the P field when an ISG is interrupted by both a Q field and a P field. This is shown in FIG. 7. WS 710 is ten symbols long and the runt data region between the Q and P fields 720, 730 is 9 symbols long. As shown, the extras symbols 740 are placed in the runt data region. Furthermore, the symbol length 780 between the end of data region 770 and the beginning of Q field 720 is ten—too small for the eleven symbols of WS 710 and the postamble. WS 710 is then placed after the P field 730. The ISG length of thirty symbols (nine symbols each in extra symbols 740, 750, the 1-symbol each preamble and postamble, and WS 710) guarantees that the write splice will always fit either before the Q field or after the P field.

With bit-patterned media, consideration is given to the placement of write splices on the media near Q fields and P fields. Again, the duration of the write splice represents a current transient in the writer circuit that would interfere with any read operation, such as recovering a P field. In addition, preamplifiers can produce a high-frequency "degaussing" burst to the writer shortly after switching out of write mode. These degaussing bursts and current transients in the writer are preferred not to overlap any Q, P or servo field on the media since these fields should maintain their default magnetization state. Therefore, "invalid write splice" regions are defined by the formatter to prevent any portion of a write splice from overlapping a Q or P field. Protection of the servo fields is achieved automatically by the track layout and the gaps before and after servo without the need for additional functionality in the formatter.

Note that by calculating a single ISG size that works for every ISG location around each data track of a zone, and taking into account the fixed symbol length of the Q and P fields, postambles, preambles and other overhead, the formatter ensures that all data tracks within a recording zone have the same physical track layout and the same sector capacity. This is so regardless of how the runt data region size between Q and P fields varies with a transducing head skew angle and the linear bit density, and regardless of any particular transducing head reader-writer gap size. This small tradeoff in format efficiency allows for significant reductions in firmware and manufacturing complexity.

Figure 8:
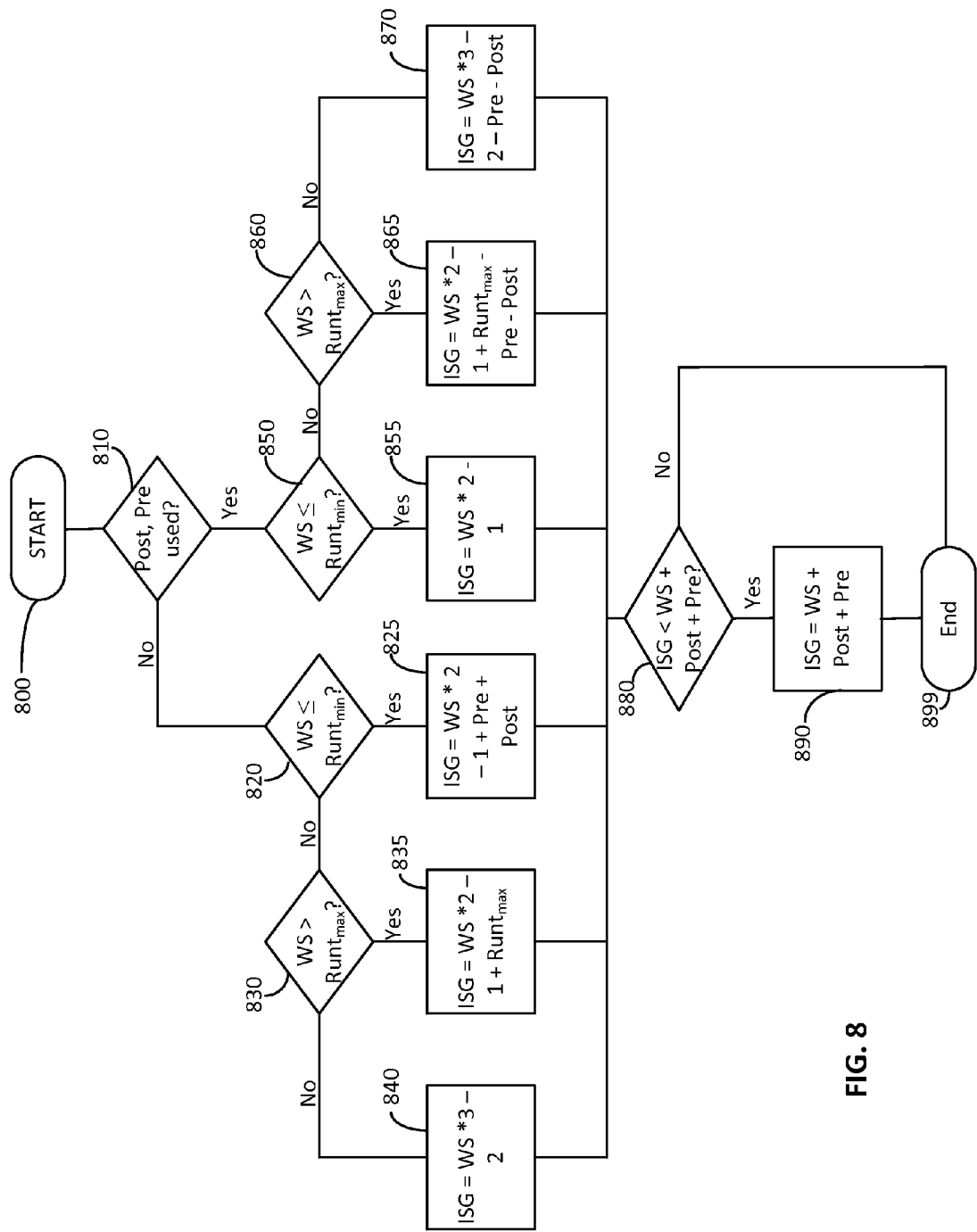
FIG. 8 is a flowchart of a calculation for an intersector gap.

A method for calculating the symbol length of the ISG is shown in FIG. 8. The method considers whether postamble and preamble fields are used around the Q fields. Also, the minimum and maximum runt data region symbol lengths $Runt_{min}$, $Runt_{max}$ between the Q and P fields for the corresponding recording zone have been pre-calculated, as has the worst-case write splice symbol length. Here note that the symbol length of the runt data region may vary in a zone because the reader-writer gap may vary due to head skew changes over that zone. If the reader-writer gap increases so as to encroach upon the symbol preceding the Q field, that symbol will be included in the Q field. But the symbol at the other end of the Q field will be added to the adjacent runt data region. The result is that the Q fields stay the same length as well as the total number of symbols in the data regions. To further explain this result, consider FIG. 2b where the Q fields 202 would be shifted one symbol earlier in the data wedge of track N. Then the adjacent runt data region length would increase by one symbol. In this case track N can still be included in the zone with the other tracks shown.

Returning to FIG. 8, the method starts at step 800, then proceeds to step 810 to determine if postambles and preambles are used around the Q fields. If no, the method proceeds to step 820 to determine if the WS symbol length is less than or equal to $Runt_{min}$. If yes, the method proceeds to step 825 where the intersector gap symbol length is set equal to the write splice symbol length times 2, then minus 1 plus the preamble and postamble symbol lengths. If no, the method proceeds to step 830 to determine if the WS symbol length is greater than Runt. If yes, the method proceeds to step 835 where the intersector gap symbol length is set equal to the write splice symbol length times 2, then minus 1 plus $Runt_{max}$. If no, the method proceeds to step 840 where the intersector gap symbol length is set equal to the write splice symbol length times 3, then minus 2.

Returning to step 810, if postambles and preambles are used around the Q fields, the method proceeds to step 850 to determine if the WS symbol length is less than or equal to $Runt_{min}$. If yes, the method proceeds to step 855 where the intersector gap symbol length is set equal to the write splice symbol length times 2, then minus 1. If no, the method proceeds to step 860 to determine if the WS symbol length is greater than $Runt_{max}$. If yes, the method proceeds to step 865 where the intersector gap symbol length is set equal to the write splice symbol length times 2, then minus 1 plus $Runt_{max}$ minus the preamble and postamble symbol lengths. If no, the method proceeds to step 870 where the intersector gap symbol length is set equal to the write splice symbol length times 3, then minus 2 minus the preamble and postamble symbol lengths.

From steps 825, 835, 840, 855, 865 and 870 the method proceeds to step 880 to determine if the intersector gap symbol length is less than the write splice symbol length plus the preamble and postamble symbol lengths. If yes, the method proceeds to step 890 where the intersector gap symbol length is set equal to the write splice symbol length plus the preamble and postamble symbol lengths. Then the method terminates at step 899. If no, the method terminates at step 899.

Alternatively, the BPM formatter could be designed to lay out smaller ISGs where they are not interrupted by a Q or P field, and larger ISGs where interruptions require the write splice to be shifted to a later media position. Refer to FIG. 7 that shows a larger ISG than the ISG in FIG. 4. However, with this approach, track layouts and capacities will vary within a recording zone, from head to head, and from drive to drive. This adds to the complexity of the disc drive firmware.

Referring back to FIG. 1, disc formatter 60 models the BPM with symbol resolution, where a symbol can be defined as a unit of data transferred between formatter 60 and read channel 50 in one clock cycle. A symbol size can be 12 bits. All fields in the data wedges between servo fields preferably are defined in terms of integer numbers of symbols. These fields include Q fields, P fields, the gaps before and after the servo fields, data regions, intersector gap fields, write splice fields, preamble fields and postamble fields.

For each data region on the media, formatter 60 calculates the data wedge format and transfers an information packet to the channel 50. The information packet provides data access information to the channel such as the amount of data to be accessed, data identification and/or overhead information.

For read channels that are capable of writing (a specified polarity of DC pattern) through the servo field for a split sector, the first sector fragment of the data wedge might not have a starting write splice, and the last sector fragment of the data wedge might not have an ending write splice. (For large sector sizes, the starting sector fragment and ending sector fragment in a data wedge might be the same fragment.)

Prior to accessing data on the BPM, channel 50 and formatter are programmed with overhead information for the desired track. This programmed information may also be used in whole or in part for a zone that the track belongs. The overhead information includes whether preambles and postambles are used, the symbol size of the preambles, postambles, WS, Q field, P field, runt data regions, the location of the Q fields, and any other additional information to allow data access. This information is programmed by the disc drive controller firmware into respective configuration registers (not shown) in the channel and the formatter.

During the reading of the data, channel 50 may encounter a Q field or P field, based on its internal symbol counter and its programmed Q and P field parameters. When such encounters occur, channel 50 automatically pauses its data symbol decoding before the Q field or P field, and automatically resumes its data symbol decoding after the Q field or P field. If preamble and postamble fields are enabled in channel 50 configuration registers, channel 50 also automatically pauses its data symbol decoding over preamble and postamble fields.

In write mode, while actively writing to the media, channel 50 automatically holds the write data to a predetermined (possibly programmable) DC level when the writer is over the Q fields or the P fields. Specifically, channel 50 does not transition the write current (either by changing the write data or by turning the preamplifier on or off) while the reader is over a P field. Channel 50 does not cause the preamplifier to exit write mode if the writer is over a P field or if the writer will be over a P field before the write splice time expires. This also supports preamplifiers that generate a high-frequency "degaussing" burst to the writer during the write current turn-off period.

Instead of phase locked oscillator and sync fields, each sector will begin with a write splice field. Channel 50 is programmed with the size of this write splice field, which will potentially vary with recording zone, but will not vary on a given data track. Optionally, split data sectors also include a write splice field before and after the servo field, if writing through servo fields cannot be supported (for example, due to the use of repeatable run-out fields or other data fields written into each servo field). Channel 50 automatically writes a default (possibly 2 T) pattern during the write splice field when writing to the media, and will automatically skip the write splice field when reading from the media.

As described above, the BPM architecture will support preamble fields at the beginning of each contiguous run of sector data and postamble fields at the end of each contiguous run of sector data, to provide opening and closing sequences for the maximum-likelihood decoder in the channel.

Formatter 60 calculates the data format for the upcoming data wedge. To do that, either the formatter has already calculated an immediately previous data wedge format and can use that to calculate the upcoming data wedge format. Or the formatter has to catch up to understand the previous data wedge format, particularly if a data sector is split across a servo wedge. This catch up can occur when the transducing head has moved tracks.

Figure 9:
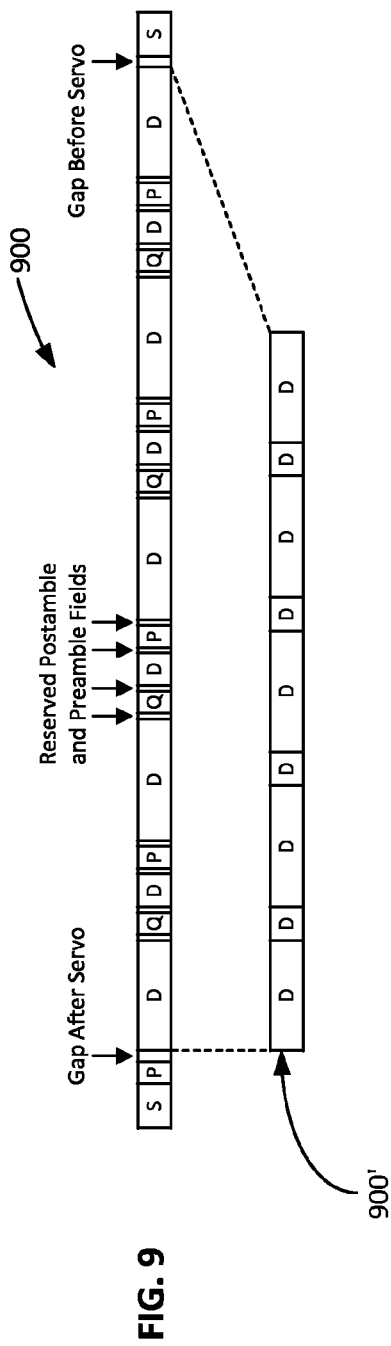
FIG. 9 illustrates data regions without certain overhead.

First, the formatter understands what servo wedge, actual or logical, the transducing head is over. Next the formatter determines if a first data region of the upcoming data wedge is part of a split data sector or begins a new data sector. This determination is done by the formatter using another model of the data wedge as a contiguous group of data regions (with the Q and P fields removed, along with their reserved postamble and preamble fields) as shown in FIG. 9. A data format of data wedge 900 is shown between two servo wedges. Data wedge 900 includes data regions D, Q and P fields, and preamble and postamble fields. However, for purposes of this determination, the formatter discards the Q and P fields along with the associated preamble and postamble fields (the transducer overhead), and ignores the gaps before and after the servo wedges. In this way, the formatter only considers the data regions shown as 900'. The data regions in 900' are effectively concatenated data. Note that for this concatenated data model the data regions include all write splices, ISGs, and the non-reserved preambles and postambles. The write splices, ISGs, and non-reserved preambles and postambles can be considered individually and collectively as fragment overhead. Non-overhead includes the actual data that can be considered as data symbols.

In addition, the formatter takes into account that the overhead—Q and P fields, ISGs, preambles, postambles, write splices, gaps before and after servo—within each data wedge of a track are constant, regardless of how data sectors are interrupted by Q and P fields. Every ISG field on the track is the same size. Every write splice field is the same size. Every Q field is assumed to have a postamble field immediately before it and a preamble field immediately after it. (Preamble and postamble fields may not be required around the Q fields; in this case, these preamble and postamble fields will be assumed to be zero-length.) Every P field is assumed to have a preamble field immediately after it, and every P field except the first one in each data wedge is assumed to have a postamble field immediately before it. If a gap after servo (GAS) field is used (for example, to contain repeatable timing run-out information), it occurs after the first P field of every data wedge. Given all that, the data regions 900' have the same number of symbols for each data wedge of a track. That can extend to all or part of the tracks that make up a recording zone.

Using the fact that the data regions 900' have the same number of symbols and the same-sized overhead for each data wedge of a track, the formatter can quickly determine the upcoming data wedge's data format. For example, consider that a transducing head settled on a new track. The first servo wedge it encounters is servo wedge 2. With the formatter knowing that each data sector size is X and the data regions 900' total size is Y (Y≥X), the formatter divides Y by X and then multiplies the result by the number of preceding data wedges (2 in this case). Any fraction starts the data region immediately after servo wedge 2. The formatter can then start generating the data access information knowing the lengths and locations of the overhead symbols and the symbol lengths of the data sector and data regions 900'.

If writing through the servo fields is supported by the disc drive, the formatter defines the capacity of a data wedge that begins with a new sector (e.g., "wedge 0" on the data track), since these types of data wedges will be slightly smaller in capacity compared to data wedges that begin with a split sector. This slightly reduced capacity of "wedge 0" type wedges is due to the fact that wedges that start with a new sector will begin with a write splice, whereas wedges that begin with a split sector will not begin with a write splice.

The data wedge model works well for the formatter to determine if the upcoming data wedge starts with a split data sector, but it can create a timing issue if the fragment descriptors are generated using only the same model without accounting for the locations and sizes of the Q and P fields. If the formatter did not consider the placement of the Q and P fields, the formatter would assert RS or WRS earlier and earlier for the next sector as it traversed the data wedge. Asserting WRS earlier than necessary for a target sector would increase the likelihood that channel 50 would not have encoded write data ready for the next sector just before WRS is asserted. This timing issue could put additional stress on the channel's data encoding pipeline, and it is considered undesirable.

This formatter model allows the quick calculation of the split configuration at the end of any data wedge, given the split configuration at the beginning of the data wedge. It also allows for the quick calculation of the impending data wedge format based on the actual or logical servo wedge zero. This model also allows for substantial use of different formatter configurations.

The defined architecture allows for format-efficient data storage on bit-patterned media, while allowing for typical variations in the drive, such as reader-writer gap variations. The defined BPM architecture relaxes some timing requirements on real-time signaling from the formatter to the channel, while enabling bit-accurate alignment between data accesses and the media.

The description above is applicable for systems in which the channel and the formatter are integrated as parts of the same "system on chip", or SoC. Therefore, separate read and write data buses have been used instead of a bidirectional bus with bidirectional control signals. However, there may be circumstances where a discrete, external formatter may be used to interface to an external channel. The read and write data buses can then be combined into a single bidirectional bus to reduce overall pin count.

The detailed description is illustrative only and is intended not to limit this disclosure. Variations and modifications are possible. For example, the functionality can be performed by hardware alone, or hardware under firmware control. Any of the fields do not have to be symbol aligned. The units on the interface would then be defined as something other than symbols. Bits instead of symbols can be used. Although the length of the Q field is determined by the length of the P field as described to be as short as possible to satisfy the timing recovery requirements, the Q field can be the same size as the P field depending on the resolution the interface uses. The Q field can also be greater than or equal to the length of the P field, constrained by any physical limitations of format efficiencies taken into account.

The runt data region space can be eliminated so that the entire reader-writer gap can be just Q and P fields. The Q field could run into the P field, leaving no usable media between them. However, this situation would represent a significant format efficiency loss, which is less desirable. The write splice can be any size. The interface protocol supports a wide range of write splice lengths. Smaller is better for format efficiency. The preambles and postambles can be any size. The interface protocol can support preambles and postambles longer than one symbol. The formatter implementation is simplified by assuming they can be no longer than one symbol. The preamble and/or postamble can be eliminated from the ISG. However, induced bit errors may occur. The ISG does not have to include extra symbols. Including extra symbols in the ISG helps to keep the formatter logic less complex. A symbol can be anything less than a sector in size. The symbol width is chosen to be a practical unit of data transfer and timing management for both the read channel and the formatter.

Figure 10:
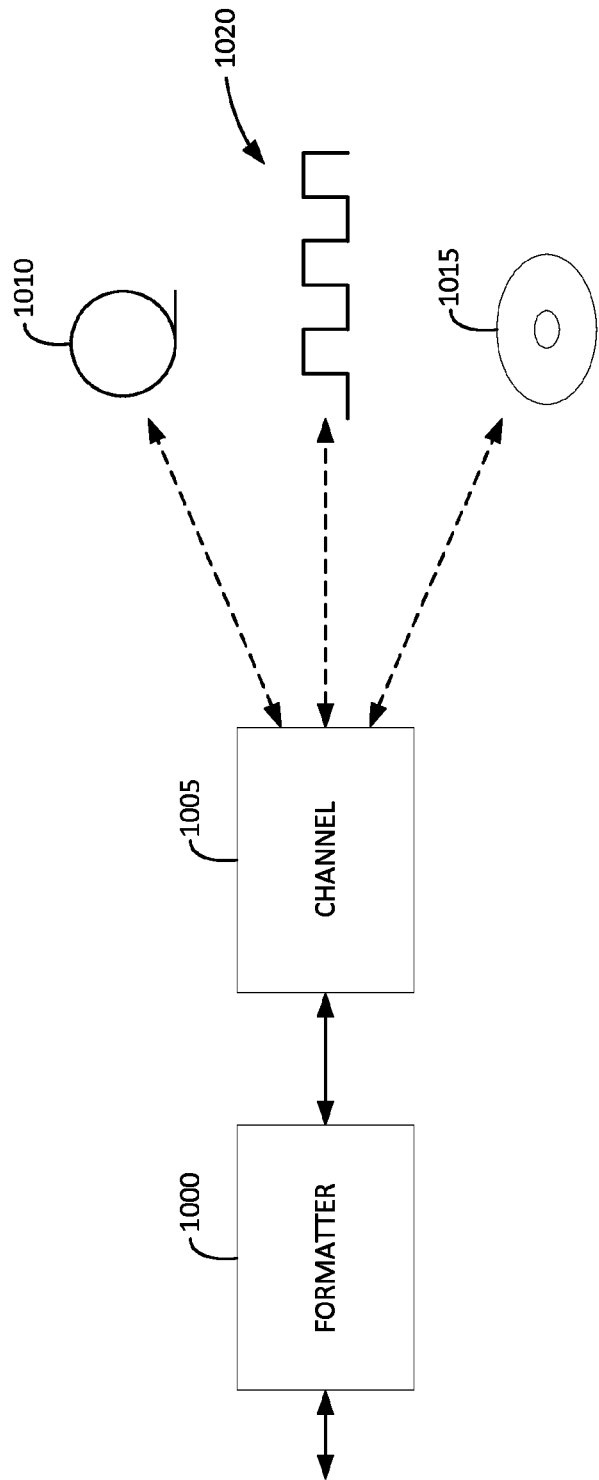
FIG. 10 shows a formatter and a channel coupled to various digital data streams.

The interface described could be used with other types of media, such as non-bit-patterned media, heat assisted magnetic recording media, tape and optical. The interface described can be used for a digital data stream coupled to the channel. To illustrate, FIG. 10 shows a formatter 1000 and channel 1005 coupled to one of a tape 1010, optical 1015 and data stream 1020.

The described apparatus and methods should not be limited to the particular examples described above. Various modifications, equivalent processes, as well as numerous structures to which the described apparatus and methods may be applicable will be readily apparent.

What is claimed is:

1. A data storage medium comprising intersector gaps wherein at least one of the intersector gaps is dimensioned relative to a physical dimension of a transducing head, wherein the at least one of the intersector gaps is dimensioned relative to a size of a read-writer gap of the transducing head.

2. The data storage medium of claim 1 further comprising at least one quiet and synchronization field pair that is interleaved with the at least one of the intersector gaps.

3. The data storage medium of claim 1 further comprising at least one synchronization field that is interleaved with the at least one of the intersector gaps.

4. The data storage medium of claim 1 further comprising at least one quiet field and at least one associated synchronization field, wherein the at least one of the intersector gaps is interleaved with at least one of the at least one quiet field and the at least one associated synchronization field.

5. The data storage medium of claim 1 further comprising a data wedge that includes the intersector gaps, wherein the intersector gaps are of equal size.

6. The data storage medium of claim 1 further comprising a data track that includes the intersector gaps, wherein the intersector gaps are of equal size.

7. The date storage medium of claim 1 further comprising a zone that includes the intersector gaps, wherein the intersector gaps are of equal size.

8. The date storage medium of claim 1 wherein the interleaving is adjustable.

9. The data storage medium of claim 1, wherein the at least one of the plurality of intersector gaps includes at least a write splice and extra symbols.

10. The data storage medium of claim 1 wherein the data storage medium is one of a bit-patterned medium and a heat-assisted magnetic recording medium.

11. A data storage medium comprising transducer overhead interleaved with fragment overhead, wherein the at least one of the intersector gaps is dimensioned relative to a size of a reader-writer gap of the transducing head.

12. The data storage medium of claim 11 wherein the transducer overhead includes at least one synchronization field and the fragment overhead includes at least one intersector gap that is adjacent to the at least one synchronization field.

13. The data storage medium of claim 12 wherein the transducer overhead includes at least one quiet field, and the fragment overhead includes at least one intersector gap that is adjacent to the at least one quiet field.

14. The data storage medium of claim 11 wherein the transducer overhead includes a pair of synchronization and quiet fields, and the fragment overhead includes at least one intersector gap that is interleaved with the pair of synchronization and quiet fields.

15. The data storage medium of claim 11 further comprising one of a data wedge and a data track that includes preamble and postamble fields of equal size.

16. The data storage medium of claim 15 wherein one of the data wedge and the data track includes quiet fields of equal size.

17. The data storage medium of claim 11 wherein the data storage medium is one of a bit-patterned media and a heat-assisted magnetic recording medium.

18. A data storage system comprising:
- a storage medium comprising intersector gaps located between adjacent sectors that each include a write splice and one or more extra symbols to accommodate one or more interspersed phase-locked loop field interruptions or quiet field interruptions; and
- a read/write transducer to interact with the storage medium by either writing data to the storage medium or reading data from the storage medium.

* * * * *